US012585485B2

(12) United States Patent
Massry

(10) Patent No.: US 12,585,485 B2
(45) Date of Patent: Mar. 24, 2026

(54) WARM MIGRATIONS FOR VIRTUAL MACHINES IN A CLOUD COMPUTING ENVIRONMENT

(71) Applicant: Akamai Technologies, Inc., Cambridge, MA (US)

(72) Inventor: Abraham Massry, Cherry Hill, NJ (US)

(73) Assignee: Akamai Technologies, Inc., Cambridge, MA (US)

( * ) Notice: Subject to any disclaimer, the term of this patent is extended or adjusted under 35 U.S.C. 154(b) by 725 days.

(21) Appl. No.: 17/895,687

(22) Filed: Aug. 25, 2022

(65) Prior Publication Data

US 2024/0069946 A1 Feb. 29, 2024

(51) Int. Cl.
*G06F 9/455* (2018.01)
(52) U.S. Cl.
CPC .................... *G06F 9/45558* (2013.01); *G06F 2009/45562* (2013.01); *G06F 2009/4557* (2013.01)
(58) Field of Classification Search
CPC ....... G06F 9/45558; G06F 2009/45562; G06F 2009/4557
See application file for complete search history.

(56) References Cited

U.S. PATENT DOCUMENTS

| | | | |
|---|---|---|---|
| 6,854,115 B1 | 2/2005 | Traversat et al. | |
| 9,110,702 B2 | 8/2015 | Reuther et al. | |
| 9,197,489 B1 | 11/2015 | Vincent | |
| 9,329,886 B2 | 5/2016 | Vincent | |
| 9,626,206 B2 | 4/2017 | Bennett et al. | |

(Continued)

FOREIGN PATENT DOCUMENTS

| | | | | | |
|---|---|---|---|---|---|
| CN | 105138394 | A | * | 12/2015 | |
| CN | 108121592 | A | * | 6/2018 | ......... G06F 9/45558 |

(Continued)

OTHER PUBLICATIONS

"Live migrations," DigitalOcean, https://docs.digitalocean.com/products/droplets/details/live-migration/, Mar. 28, 2019.

(Continued)

*Primary Examiner* — Chat C Do
*Assistant Examiner* — Selina Elisa Hu
(74) *Attorney, Agent, or Firm* — David H. Judson

(57) ABSTRACT

A method of "warm" migrating a virtual machine (VM) on a source host to a target virtual machine on a destination host. The method begins by mirroring contents of disk onto a target disk associated with the target VM. Transfer of the RAM contents is then initiated. Unlike live migration strategies where data transfer occurs at a high rate, the RAM contents are transferred at a low transfer rate. While the contents of the RAM are being transferred, a shutdown of the virtual machine is initiated. This operation flushes to disk all of the remaining RAM contents. Before the shutdown completes, those remaining contents, now on disk, are mirrored to the target disk. Once that mirroring is finished, the shutdown of the virtual machine is completed, and this shutdown is mirrored at the destination host. To complete the warm migration, the target virtual machine is then booted from the target disk.

17 Claims, 4 Drawing Sheets

(56)                    References Cited

U.S. PATENT DOCUMENTS

| | | | | |
|---|---|---|---|---|
| 10,552,200 | B2 * | 2/2020 | Franciosi ............ | G06F 9/45558 |
| 10,884,790 | B1 | 1/2021 | Saidi et al. | |
| 2011/0208908 | A1 | 8/2011 | Chou et al. | |
| 2013/0014103 | A1 * | 1/2013 | Reuther ................ | G06F 3/0647 |
| | | | | 718/1 |
| 2014/0181397 | A1 | 6/2014 | Bonzini | |
| 2015/0143372 | A1 | 5/2015 | Bercovici et al. | |
| 2016/0299773 | A1 | 10/2016 | Dong et al. | |
| 2018/0074840 | A1 | 3/2018 | Chai et al. | |
| 2019/0294462 | A1 | 9/2019 | Franciosi et al. | |
| 2020/0034190 | A1 | 1/2020 | Tarasuk-Levin et al. | |
| 2022/0214905 | A1 * | 7/2022 | Balakumaran ...... | G06F 12/0882 |

FOREIGN PATENT DOCUMENTS

| | | | | | |
|---|---|---|---|---|---|
| CN | 114003335 | A | * | 2/2022 | ......... G06F 9/45558 |
| JP | 6421470 | B2 | * | 11/2018 | |

OTHER PUBLICATIONS

Massry, "Live Migrations at Linode," Linode, https://www.linode.com/blog/linode/live-migrations-at-linode/, May 17, 2022.
PCT/US2023/031111, International Search Report and Written Opinion mailed on Dec. 20, 2023, 10 pages.

* cited by examiner

106

400 — RECEIVE REQUEST FOR WARM MIGRATION

402 — IDENTIFY DESTINATION HOST

404 — START TARGET VM

406 — MIRROR DISK TO TARGET DISK ON DESTINATION

408 — INITIATE TRANSFER OF RAM AT LOW RATE

410 — INITIATE SHUTDOWN OF VM

412 — MIRROR FLUSHED RAM CONTENTS TO TARGET DISK

414 — COMPLETE SHUTDOWN OF VM

416 — DONE?
NO → ABORT — 418
YES

420 — UPDATE DB TO REFLECT NEW VM LOCATION

422 — BOOT TARGET VM FROM TARGET DISK

WARM MIGRATIONS FOR VIRTUAL MACHINES IN A CLOUD COMPUTING ENVIRONMENT

BACKGROUND

Technical Field

This application relates generally to migrating workloads in a cloud computing environment.

Brief Description of the Related Art

Cloud computing is an information technology delivery model by which shared resources, software and information are provided on-demand over a network (e.g., the publicly-routed Internet) to computers and other devices. This type of delivery model has significant advantages in that it reduces information technology costs and complexities, while at the same time improving workload optimization and service delivery. In a typical use case, an application is hosted from network-based resources and is accessible through a conventional browser or mobile application. Cloud compute resources typically are deployed and supported in data centers that run one or more network applications, typically using a virtualized architecture wherein applications run inside virtual servers, or virtual machines (VMs), which are mapped onto physical servers in the data center. The virtual machines typically run on top of a hypervisor, which allocates physical resources to the virtual machines.

In cloud computing, "live migration" refers to the process of moving a running virtual machine or application between different physical machines without disconnecting the client or application. Memory, storage, and network connectivity of the virtual machine are transferred from the original guest machine to the destination. If two host machines have incompatible hardware (e.g., different CPU flags, or different CPUs), however, the host machines are not compatible for live VM migration. The reason why live migration does not work with incompatible hardware is that, when virtual machine instructions execute, they expect CPU features to be available and, in particular, because user space programs running inside the virtual machine are not aware they are being virtualized. If the CPU features change on them mid-run (as would occur during a live VM migration), the programs crash, leading to a crash of the whole virtual machine. A known alternative to live migration in this context (incompatible hardware) is sometimes referred to as a "cold migration." Cold migrating involves shutting the virtual machine down and transferring the data on associated disks to a new host, and then starting the virtual machine back up on the new host. The problem with this latter approach, however, is that the virtual machine has to be down the entire time.

There remains a need to provide new techniques to enable migration of workloads in a cloud compute environment and that address the above-noted deficiencies in the art.

BRIEF SUMMARY

In one aspect, a method of "warm" migrating a virtual machine (VM) on a source host to a target virtual machine on a destination host is described. The source and destination hosts are not required to have identical hardware, and the migration is carried out in real-time with minimal downtime. The virtual machine has associated disk and RAM. The method begins by mirroring contents of the disk onto a target disk associated with the target virtual machine. Transfer of the contents of the RAM is then initiated. Unlike live migration strategies where data transfer occurs at a high rate, the transfer of the RAM contents occurs at a very low transfer rate (e.g., approximately one (1) byte per second). This low transfer rate ensures that the RAM contents are not substantially depleted. While the contents of the RAM are being transferred at the transfer rate, however, a shutdown of the virtual machine is initiated. This operation has the effect of flushing to disk all of the remaining contents of the RAM. Before the shutdown completes, those remaining contents of the RAM, now on disk, are mirrored to the target disk. Once that mirroring is finished, the shutdown of the virtual machine is completed, and this shutdown is mirrored at the destination host as well. To complete the warm migration, the target virtual machine (which has just been shut down) is then booted from the target disk. The approach herein enables migration of the virtual machine and instantiation of the target virtual machine with minimal downtime, e.g., approximately thirty (30) seconds and, as noted above, migration may be carried out where the source and designation host have different or even incompatible hardware.

The foregoing has outlined some of the more pertinent features of the disclosed subject matter. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the subject matter and the advantages thereof, reference is now made to the following descriptions taken in conjunction with the accompanying drawings, in which.

DETAILED DESCRIPTION

The techniques herein typically are implemented in a data center operated by a virtual machine (VM) hosting provider. A representative provider is Linode®, now owned by Akamai Technologies, Inc., of Cambridge, Massachusetts.

Figure 1:
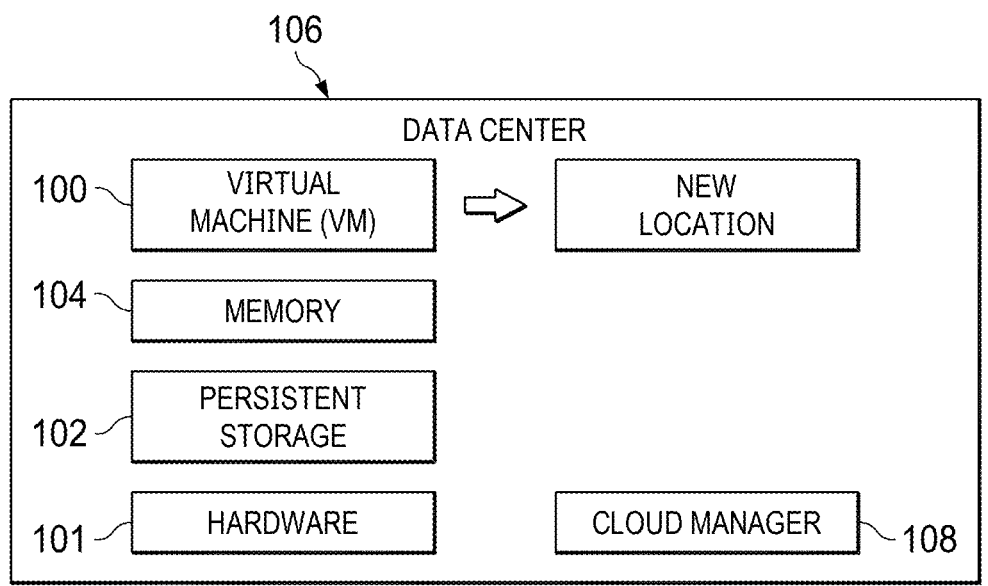
FIG. 1 depicts a representative virtual machine (VM) operating environment with a data center.

A representative VM is depicted in FIG. 1. The VM 100 has associated therewith persistent storage 102, the amount of which typically varies based on size and type, and memory (RAM) 104. The local persistent storage typically is built on enterprise-grade SSDs (solid state disks). The VM's persistent storage space can be allocated to individual disks. Disks can be used to store any data, including the operating system, applications, and files. A representative VM is equipped with two (2) disks, a large primary disk used to store the OS distribution (typically Linux), software, and data, and a smaller swap disk, which is used in the event the VM runs out of memory. While two disks are typical, the VM can be configured to have many more disks, which can serve a variety of purposes including dedicated file storage or switching between entirely different Linux distributions. When multiple disks are added to a VM, configuration profiles are used to determine the disks that are accessible with the VM is powered on, as well as which of those disks serves as a primary root disk. Using tools provided by the service provider, disks can be created, resized, cloned and deleted. In addition, and using a cloud manager 104, the VM can be migrated to another data center (if the provider operates multiple data centers), or to another location within the data center 106. The "warm migration" technique described herein typically is designed for use within a particular data center, although this is not necessarily a requirement.

Generalizing, the techniques may be implemented in a computing platform, wherein one or more functions of the computing platform are implemented conveniently in a cloud-based architecture. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available services models that may be leveraged in whole or in part include: Software as a Service (SaaS) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof. Typically, the cloud computing environment has a set of high level functional components that include a front end identity manager, a business support services (BSS) function component, an operational support services (OSS) function component, and the compute cloud components themselves.

According to this disclosure, the services platform described below may itself be part of the cloud compute infrastructure, or it may operate as a standalone service that executes in association with third party cloud compute services.

Live Migrations

By way of background, when developers deploy a workload to a cloud computing platform, they often do not pause to think about the underlying hardware that their services run on. In the idealized image of the "cloud," hardware maintenance and physical limitations are invisible. Unfortunately, hardware does need maintenance occasionally, which can cause downtime. Live migration technologies are implemented to address having to pass this downtime on to customers. To that end, live migration is a solution that allows VM instances to move between physical machines without interruption of service. When a VM is moved using live migration, the transition is invisible to that VM's processes. If a host's hardware needs maintenance, live migration can be used to seamlessly transition all of that host's VMs to a new host. After this migration is finished, the physical hardware can be repaired, and the downtime does not impact customers.

Live migration may take advantage of QEMU, an open source emulator. QEMU is a virtualization technology that emulates a machine's processor through dynamic binary translation. It provides a set of different hardware and device models for the machine, enabling it to run a variety of guest operating systems. For example, QEMU can interoperate with Kernel-based Virtual Machine (KVM) to run virtual machines at near-native speed. QEMU can also do emulation for user-level processes, allowing applications compiled for one architecture to run on another. Applications communicate with and control a QEMU instance over the QEMU Machine Protocol (QMP), which is a lightweight JSON-based protocol. A QEMU process tree is laid out as a controlling process and several worker processes. One of the worker processes is responsible for handling a live migration, returning QMP calls, and the like. The other processes map one-to-one with guest CPUs. The guest's environment is isolated from this side of QEMU and behaves as its own independent system. Live migrations is a QEMU feature.

Figure 2:
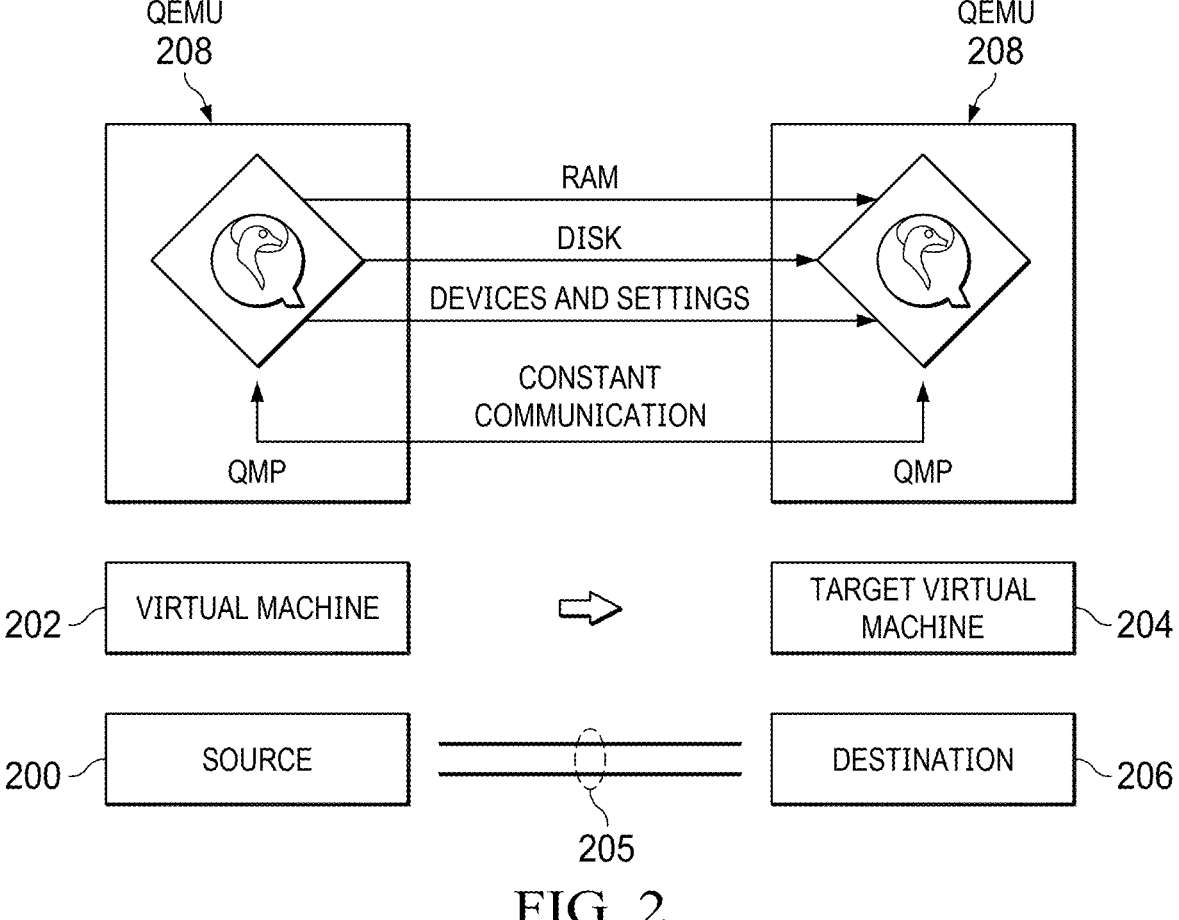
FIG. 2 depicts a process flow for a known live migration operation.

In a typical live migration operation, and with reference to FIG. 2, assume there is source hardware (host) 200 running a source virtual machine (VM) 202, and the goal is to live migrate the source VM 202 to a destination VM 204 on destination hardware (host) 206. In this example, the source and destination hardware are located in a same data center and are coupled via a private network 205. The source and destination hardware execute QEMU instances 208. In a representative operation, a destination QEMU instance is spun up, preferably with the exact same parameters that exist on the source QEMU instance. The disks on the source hardware are then live migrated over to the destination hardware. Any changes to the disk are communicated as well while this transfer is running. Then, the memory (i.e., RAM) on the source hardware is live migrated over to the destination. Any changes to the RAM pages have to be communicated as well. If there are any disk data changes during the RAM transfer phase, then those change are also copied over to the disk of the destination QEMU instance. Eventually, a cutover point is executed. When QEMU determines that there are few enough pages of RAM left on the source so that it can confidently cut over, the source and destination QEMU instances are paused for approximately 2 seconds. QEMU on the source copies over the last few pages of RAM and the machine state. The machine state includes the CPU cache and the next CPU instruction. Then, QEMU instructs the destination to start, and the destination picks up where the source left off.

Figure 3:
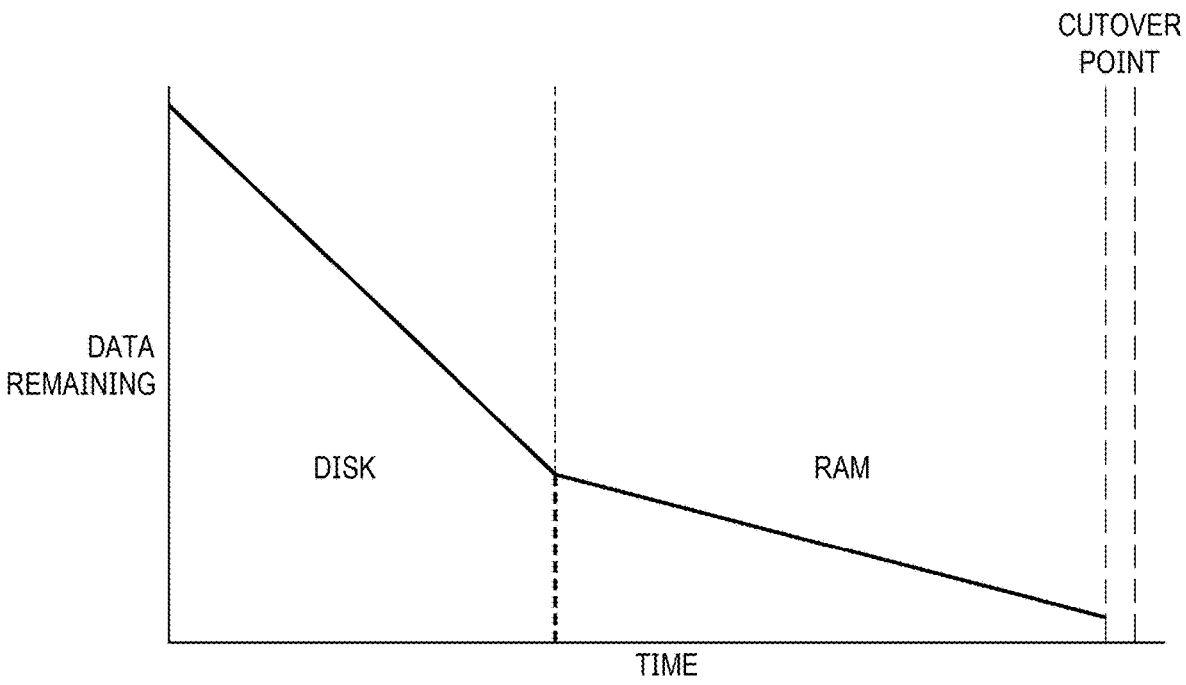
FIG. 3 depicts a graph of how disk and RAM contents are migrated during the live migration operation.

FIG. 3 depicts a graph of data migration during the above-described live migration process. As noted above, when live migration begins, the QEMU control thread running on the source starts to migrate disk contents associated with the source. As the disk contents are exhausted, and as shown in the graph, the QEMU control thread starts migrating RAM contents. In live migration, these operations are configured to occur as fast as possible. As soon as RAM migration starts, typically a command to shut down the source VM is issued by the QEMU instance running on the source host, and this shutdown command is mirrored to the destination host, which is running its own QEMU instance. When as depicted in FIG. 3 cutover is reached, the source and destination QEMU instances are paused. QEMU on the source copies over the last few pages of RAM and the machine state. Then, the QEMU control thread on the destination instructs the destination VM to start, and the destination picks up where the source left off.

The above operations explain how to perform a live migration at a high level. That said, specifying exactly how the destination QEMU is to be started is a very manual process. Moreover, each action in the process needs to be started at precisely the right time. The cutover operation is the most critical. As described, at the cutover point QEMU has determined that it is ready to cut over and start running on the destination machine. To that end, the source QEMU instance instructs both sides to pause. This means several things: (1) time stops according to the guest, and (2) network requests stop. Regarding point (1), if the guest is running a time synchronization service like the Network Time Protocol (NTP), then NTP will automatically resync the time after live migration completes. This is because the system clock will be a few seconds behind. Regarding point (2), if network requests are TCP based (e.g., SSH, HTTP, etc.), there will be no perceived loss in connectivity; if, however, those network request are UDP-based (e.g., live streaming video), a few dropped frames may occur. Because time and network requests are stopped, it is desirable for the cutover to happen as quickly as possible. However, there are several things that need to be checked first to ensure that the cutover succeeds. In particular, a check must be done to make sure that the live migration completed without errors. If there was an error, the system must roll back, un-pause the source VM, and not proceed further. Another check must be done to ensure networking is going to turn off at the source and start up at the destination properly. Further, other portions of the infrastructure must be informed regarding exactly what physical machine this destination VM now resides on. After these issues are addressed, the cutover is completed. The source VM automatically gets a completed signal and instructs the destination VM to start. As described, the destination VM then immediately picks up where the source VM left off. Any remaining items on the source and the destination are cleaned up.

Warm Migrations

With the above as background, the technique of this disclosure is now described. The operating scenario is presumed to be a cloud compute data center that hosts physical machines (CPUs, disks, memory, etc.). Control software (hypervisors), operating systems (typically Linux), and virtual machines (VMs) are instantiated and executed on this hardware in a known manner, and data center also includes internal tooling and resources (e.g., QEMU, as described above) to orchestrate migrations and other VM-to-VM communication(s). A customer accesses the data center and is assigned a source virtual machine. It is assumed that the customer is using the source virtual machine for a workload, and it is desired to migrate the workload to another host in the data center with minimal downtime (e.g., on the order of less than 30 seconds). In this scenario, the system tooling is configured to examine the hardware fleet in the data center and determine which host should be the destination for the source virtual machine. Unlike the live migration scenario described above, however, it is not required that the source and destination have the same or even compatible hardware. In general, the warm migration approach herein assumes that there are differences between the source and destination machines. Typically, these differences are manifest in different CPU flags being present. CPU flags generally correspond to the host CPU's model number and features. When a migration is requested, the internal tooling (an allocator function) builds a list of destinations, and a destination machine is selected. The manner by which this selection occurs is not a limitation of this disclosure, but it is assumed that the allocator identifies one or more matches (and perhaps a best match) for the current source VM. This determination typically is based on the source VM's size in terms of CPU, disk and memory.

Once the system identifies the destination machine, the warm migration is initiated. Unlike the live migration described above in which the disk and RAM transfers occur as fast as possible, the notion of a warm migration involves slowing down the RAM transfer rate as low as possible so as to prevent the QEMU instance running on the source host from reaching the cutover point. For example, the transfer rate may be as low as one (1) byte per second. The destination VM, which has been started, is running in a so-called incoming state. The transfer rate slowdown, however, prevents QEMU from reaching cutover; advantageously, this enables the internal tooling (the system) to initiate and finish the source VM shutdown procedure before its RAM migration completes. The shutdown procedure flushes to disk what is left in RAM, and the blocks updated on the source disks (to include the contents of the flushed RAM) are then mirrored to the destination disks. The shutdown cannot complete until whatever is being written to disk completes; thus, once that has occurred (i.e., the mirroring of these contents to the destination side), the shutdown of the source VM completes, and the QEMU instances ensure that this shutdown is also initiated at the destination. Then, the system confirms that the destination host has a correct state. If the source is still running or the destination has incorrect state, the destination VM is destroyed and the migration aborted. If the destination host has the correct state, the system brings down the network tap on the source, configures networking at the destination, updates an internal database to reflect the VM's current host (the destination), and initiates boot-up of the VM on the destination host (e.g., using a boot job or an RPC command). The target VM is powered on at the destination, booting up from the already migrated disk. This completes the warm migration.

Figure 4:
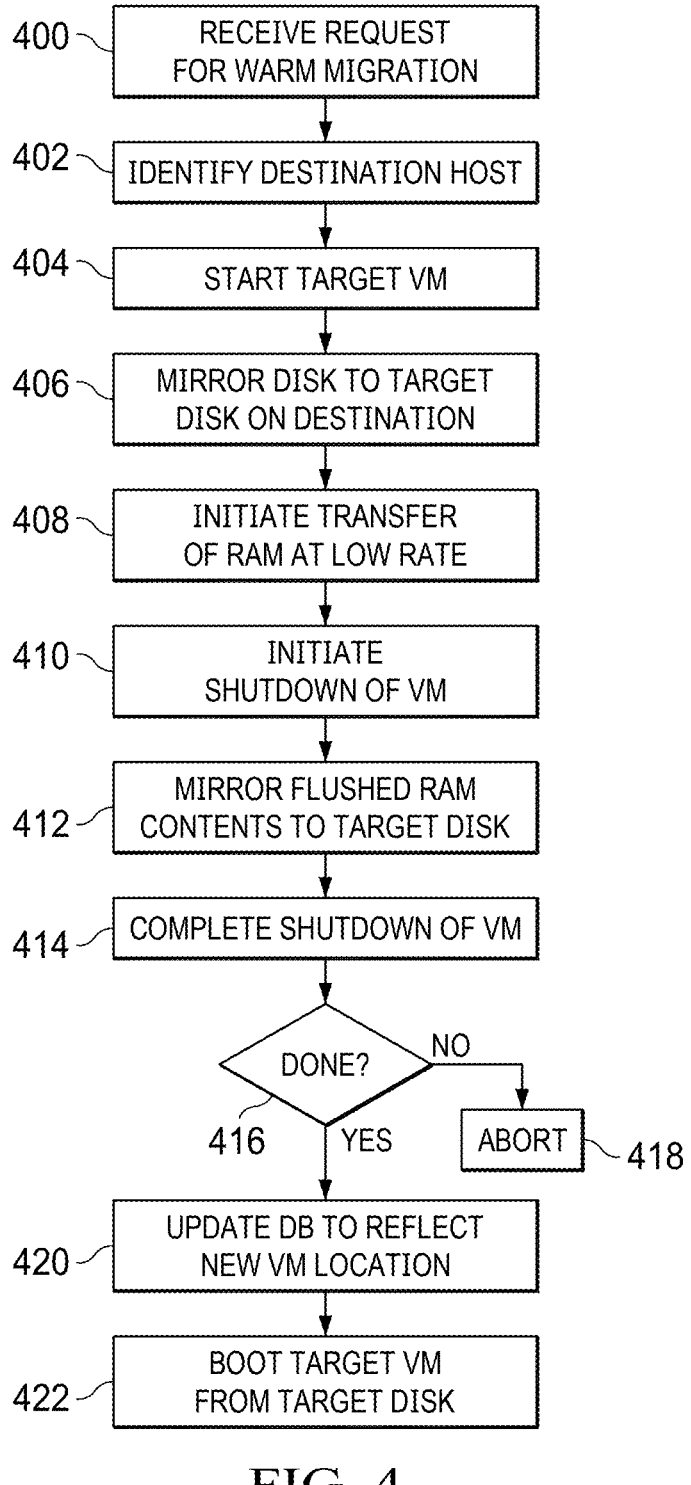
FIG. 4 is a process flow of a "warm" migration according to the techniques of this disclosure.

FIG. 4 depicts the warm migration process. The process begins at step 400 in response to receipt of a request to migrate a VM executing on a source host. At step 402, an allocator function identifies a destination host. At step 404, the target virtual machine is started in an incoming (initialized) state. At step 406, the QEMU instance associated with the VM mirrors contents of the disk onto a target disk associated with the target virtual machine. Thereafter, at step 408, the QEMU instance associated with the VM initiates transfer of the contents of the RAM at a transfer rate sufficient to prevent the RAM contents from being substantially depleted. While the contents of the RAM are being transferred at the (low) transfer rate, at step 410 the QEMU instance associated with the source host initiates a shutdown of the VM. This shutdown command has the effect of flushing to disk the remaining contents of the RAM. At step 412, the QEMU instance mirrors the remaining contents of the RAM (that have been flushed to disk) to the target disk. At step 414, the QEMU instance competes the shutdown of the virtual machine on the source host. A test is performed at step 416 to determine whether the destination host has correct state or whether the source host itself is still running. If the outcome of the test at step 414 is negative, control branches to step 418 to abort the migration. If, however, the outcome of the test at step 416 is positive, at step 420 an internal database is updated to reflect the VM's new location. At step 422, the target VM is powered on and boots from the target disk. This completes the live migration.

Warm migration according to the above-described technique provides significant advantages. They allow VMs to remain booted during most of their migration, reducing their downtime to the duration of a simple reboot. Further, because disk migration must be complete before the VM's destination is updated, this ensures that the customer's VM is always in a bootable state when a migration job exits. Migrations using this approach will fail less often, thereby reducing customer interaction with support personnel. Any failed migration is easier to debug, which benefits support teams and system administrators. The approach improves host availability by avoiding creation of VMs with no workloads that would otherwise consume CPU, disk and RAM unnecessarily. The migration approach reduces complexity and avoids the problems associated with live migrations. Low-downtime migrations such as those realized by the technique herein also enable the system operator to retire hosts more quickly.

The warm migration technique is implemented in a stand-alone manner in the usual case, and the migration may be carried by the service provider directly, i.e., without necessarily requiring any active participation by the customer using the virtual machine.

The warm migration technique may be implemented under programmatic control to be carried out in response to one or more occurrences in the data center, or to occur at a particular time-of-day.

The nomenclature herein concerning "warm" (as in warm migration) is not intended to be limiting.

Enabling Technologies

Each of the functions described herein may be implemented in a hardware processor, as a set of one or more computer program instructions that are executed by the processor(s) and operative to provide the described function.

The cloud compute infrastructure may be augmented in whole or in part by one or more web servers, application servers, database services, and associated databases, data structures, and the like.

More generally, the techniques described herein are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, networking technologies, etc., that together provide the functionality of a given system or subsystem. As described, the functionality may be implemented in a standalone machine, or across a distributed set of machines.

Each above-described process, module or sub-module preferably is implemented in computer software as a set of program instructions executable in one or more processors, as a special-purpose machine.

Representative machines on which the subject matter herein is provided may be computing machines running hardware processors, virtualization technologies (including QEMU), a Linux operating system, and one or more applications to carry out the described functionality. One or more of the processes described above are implemented as computer programs, namely, as a set of computer instructions, for performing the functionality described.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein.

This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

What I claim is as follows:

1. A method of migrating a virtual machine on a source host to a target virtual machine on a destination host, the virtual machine having disk and RAM contents, wherein the source host runs an emulator instance having a cutover point, comprising ordered steps:

mirroring contents of the disk onto a target disk associated with the target virtual machine;

initiating transfer of the contents of the RAM at a transfer rate that is as low as possible as compared to an available transfer rate so as to prevent the emulator instance running on the source host from reaching the cutover point;

while the contents of the RAM are being transferred at the transfer rate and before the contents of the RAM are depleted, initiating a shutdown of the virtual machine, thereby flushing to disk remaining contents of the RAM;

mirroring the remaining contents of the RAM that have been flushed to disk to the target disk;

completing the shutdown of the virtual machine, wherein the migration of the virtual machine to the target virtual machine occurs in less than thirty (30) seconds; and initiating a boot of the target virtual machine from the target disk.

2. The method as described in claim 1 wherein the source host and the destination host are co-located in a physical data center and have different or incompatible hardware.

3. The method as described in claim 1 wherein the transfer rate is one (1) byte per second.

4. The method as described in claim 1 wherein the shutdown initiated at the virtual machine is mirrored on the destination host, thereby also shutting down the target virtual machine.

5. The method as described in claim 1 further including identifying the destination host for migrating the virtual machine from a set of destination hosts in a data center.

6. The method as described in claim 1 further including updating a host identifier associated with the virtual machine to reflect migration to the target virtual machine.

7. An apparatus, comprising:

one or more hardware processors; and computer memory holding computer program code executed by the one or more hardware processors to migrate a virtual machine on a source host to a target virtual machine on a destination host, the virtual machine having disk and RAM contents, wherein the source host runs an emulator instance having a cutover point, the computer program code configured to execute a sequence of ordered operations:

mirror contents of the disk onto a target disk associated with the target virtual machine;

initiate transfer of the contents of the RAM at a transfer rate that is as low as possible as compared to an available transfer rate so as to prevent the emulator instance running on the source host from reaching the cutover point;

while the contents of the RAM are being transferred at the transfer rate and before the contents of the RAM are depleted, initiate a shutdown of the virtual machine, thereby flushing to disk remaining contents of the RAM;

mirror the remaining contents of the RAM that have been flushed to disk to the target disk;

complete the shutdown of the virtual machine, wherein the migration of the virtual machine to the target virtual machine occurs in less than approximately thirty (30) seconds; and initiate a boot of the target virtual machine from the target disk.

8. The apparatus as described in claim 7 wherein the source host and the destination host are co-located in a physical data center and have different or incompatible hardware.

9. The apparatus as described in claim 7 wherein the transfer rate is one (1) byte per second.

10. The apparatus as described in claim 7 wherein the shutdown initiated at the virtual machine is mirrored on the destination host, thereby also shutting down the target virtual machine.

11. The apparatus as described in claim 7 wherein the computer program code is further configured to identify the destination host for migrating the virtual machine from a set of destination hosts in a data center.

12. The apparatus as described in claim 7 wherein the computer program code is further configured to update a host identifier associated with the virtual machine to reflect migration to the target virtual machine.

13. A computer program product comprising a non-transitory computer-readable medium holding computer program code executable by a hardware processor to migrate a virtual machine on a source host to a target virtual machine on a destination host, the virtual machine having disk and RAM contents, wherein the source host runs an emulator instance having a cutover point, the computer program code configured to execute a sequence of ordered operations:

mirror contents of the disk onto a target disk associated with the target virtual machine;

initiate transfer of the contents of the RAM at a transfer rate that is as low as possible as compared to an available transfer rate so as to prevent the emulator instance running on the source host from reaching the cutover point;

while the contents of the RAM are being transferred at the transfer rate and before the contents of the RAM are depleted, initiate a shutdown of the virtual machine, thereby flushing to disk remaining contents of the RAM;

mirror the remaining contents of the RAM that have been flushed to disk to the target disk;

complete the shutdown of the virtual machine, wherein the migration of the virtual machine to the target virtual machine occurs in less than thirty (30) seconds; and initiate a boot of the target virtual machine from the target disk.

14. The computer program product as described in claim 13 wherein the source host and the destination host are co-located in a physical data center and have different or incompatible hardware.

15. The computer program product as described in claim 13 wherein the transfer rate is one (1) byte per second.

16. The computer program product as described in claim 13 wherein the computer program code is further configured to identify the destination host for migrating the virtual machine from a set of destination hosts in a data center.

17. The computer program code as described in claim 13 wherein the computer program code is further configured to update a host identifier associated with the virtual machine to reflect migration to the target virtual machine.

* * * * *